United States Patent
McGreen

Patent Number: 5,848,660
Date of Patent: Dec. 15, 1998

[54] PORTABLE COLLAPSIBLE SCOOTER

[75] Inventor: James R. McGreen, Sebastopol, Calif.

[73] Assignee: Zap Power Systems, Sebastopol, Calif.

[21] Appl. No.: 840,751

[22] Filed: Apr. 16, 1997

[51] Int. Cl.$^6$ .................................................. B62K 11/00
[52] U.S. Cl. .................. 180/206; 280/87.041; 280/87.05
[58] Field of Search ..................................... 280/638, 639, 280/87.05, 263, 641, 87.041; 180/220, 205, 65.1

[56] References Cited

U.S. PATENT DOCUMENTS

| | | | |
|---|---|---|---|
| 1,075,250 | 10/1913 | Gingold | 280/87.041 |
| 1,227,888 | 5/1917 | Converse | 280/87.041 |
| 1,614,822 | 1/1927 | Bukolt | 280/87.041 |
| 1,664,858 | 4/1928 | Headley | 280/87.041 |
| 1,689,916 | 10/1928 | Fisher | 280/87.041 |
| 1,832,018 | 11/1931 | Gossard | 280/220 |
| 2,170,978 | 8/1939 | Smith | 280/87.05 |
| 2,330,147 | 9/1943 | Rodriguez | 280/87.041 |
| 2,468,910 | 5/1949 | Zsinor et al. | 280/87.041 |
| 4,088,338 | 5/1978 | Winchell et al. | 280/220 |
| 4,168,758 | 9/1979 | Holt | 180/206 |
| 4,750,578 | 6/1988 | Brandenfels | 180/13 |
| 4,775,162 | 10/1988 | Chao | 280/87.041 |
| 4,944,360 | 7/1990 | Sturges | 180/210 |
| 5,622,759 | 4/1997 | Fuster | 280/87.041 |

FOREIGN PATENT DOCUMENTS

| | | | |
|---|---|---|---|
| 393141 | 4/1909 | France | 280/87.041 |
| 643299 | 9/1928 | France | 280/87.041 |
| 684358 | 6/1930 | France | 280/87.041 |
| 315230 | 9/1956 | Switzerland | 280/87.041 |

*Primary Examiner*—Brian L. Johnson
*Assistant Examiner*—Michael Cuff
*Attorney, Agent, or Firm*—Evers & Hendrickson; Jay P. Hendrickson

[57] ABSTRACT

An improved lightweight, durable collapsible scooter which is safe to operate and is easy and convenient to collapse, transport and store. The scooter has a steering assembly which is pivotally secured to the front portion of a frame assembly. A front wheel is rotably secured to the steering assembly and a rear wheel is rotably secured to the rear portion of the frame assembly. A hydraulic gas spring strut is pivotally secured at one end to the steering assembly and at the other end to the frame assembly. When extended, the collapsible strut releasably locks the steering assembly in an upright operating position for operation by a rider, and when the strut is in a compressed or collapsed position, it releasably locks the steering assembly in a position generally parallel to and adjacent to the frame assembly, for storing or transporting the scooter. For ease in carrying the collapsed scooter, carrying handles are provided to permit the scooter to be carried in a balanced, horizontal position, and the collapsed scooter may also be pushed or pulled by holding onto a handlebar and rolling the scooter on the front wheel. When the scooter is stored, it remains in a relatively compact, stable and horizontal position. In operation a motorized version of the scooter provides a motor controller which provides a push-and-go feature which enables a rider, when first starting to operate the scooter, to push the scooter and establish his or her balance before the motor is activated at a pre-determined rotational rate.

4 Claims, 6 Drawing Sheets

PORTABLE COLLAPSIBLE SCOOTER

BACKGROUND OF THE INVENTION

This invention relates to the field of collapsible motorized and non-motorized scooters and in particular to portable collapsible scooters.

Although portable scooters are now well known in the art, they have not been widely received as serious transportation. If a truly lightweight portable, safe, convenient and easily operable vehicle were available, it would certainly encourage persons to use the scooter as a carry-on vehicle, interfacing with automobile, bus, train, boat and aircraft transportation systems. The present invention is extremely easy and safe to operate. Additionally, when the scooter is collapsed, it is easily carried by hand due to its lightweight and compact, balanced and clean design. The scooter's enhanced portability allows users to carry it on buses and trains and then to use it to travel the few miles often needed to complete a journey. The collapsed scooter can also be easily carried upstairs, on escalators and elevators. Storage of the scooter is also facilitated in that the collapsed scooter can be easily stored in the trunk of an automobile. Further, convenience of use is enhanced due to a feature that permits the scooter to be easily recharged at home or at the office. These auxilliary transportation features complete the transportation cycle and fill the gap between station arrival and final destination.

Furthermore, previous scooters have not been readily accepted as auxiliary transportation means due to other limitations which the present invention is designed to eliminate. One such limitation relates to the method utilized to collapse the scooter. For example, the invention disclosed in U.S. Pat. No. 4,821,832 issued to Patmont describes a pivot pin which is used to fold a steering tube into a collapsed position. This invention also discloses a tubular member which holds the steering tube in an upright position during operation. The invention disclosed in U.S. Pat. No. 5,183,129 issued to Powell attempts to improve on the Patmont device by providing a one piece steering tube and is designed to collapse by rotating a front frame portion of a lower frame assembly in relation to a main frame. Although the Powell invention ostensibly provides a stronger, one-piece steering tube, the device introduces a structural limitation in that the front frame member is secured to the main frame by using a removable locking pin. The invention described in U.S. Pat. No. 5,388,659 issued to Pepe also claims an improvement over the Patmont device by designing the tubular member to include a locking means to prevent inadvertent movement of the tubular member. Each of these inventions disclose an inherent structural weakness in that the steering tube is held in its operating position without adequate structural support.

Another limitation of previous portable motorized scooters is that the motor may be activated while the scooter is not moving. Since a rider must maintain his or her balance on the scooter while in operation, a sudden activation of the motor, while the rider is attempting to stand on and begin to operate the scooter, could cause the rider to lose his or her balance, potentially causing serious personal injury to the rider and possibly resulting in property damage caused by a runaway scooter.

SUMMARY OF THE INVENTION

It is the object of the present invention to provide a new and improved portable collapsible scooter which overcomes the limitations of previously known portable scooters. The present invention accomplishes this objective by introducing a lightweight scooter which is safe to operate, and is easy and convenient to collapse, transport and store, and at the same is extremely durable.

The present invention introduces a unique collapsing mechanism which comprises a collapsible strut which is pivotally secured at one end to a steering assembly and at the other end to a scooter frame assembly. When extended, the collapsible strut releasably locks the steering assembly in an upright operating position, and when collapsed, the strut holds the steering assembly in a position generally parallel and adjacent to the scooter frame assembly.

In operation a motorized version of the scooter provides a motor controller which provides a push-and-go feature which enables a rider, when first starting to operate the scooter, to push the scooter and establish his or her balance when beginning to before the motor is activated at a predetermined rotational rate.

In a collapsed position the present invention includes a carrying handle to enable the scooter to be easily carried in a balanced, horizontal position, and the collapsed scooter may be pushed or pulled by holding onto a handlebar and rolling the scooter on a front wheel. The collapsed scooter is also designed such that the scooter may be easily stored in a generally flat, compact, stable and horizontal position.

These and other features, advantages and objects of the present invention will be described in greater detail in the following description and claims, and in conjunction with the drawings.

DESCRIPTION OF PREFERRED EMBODIMENT

Figure 1:
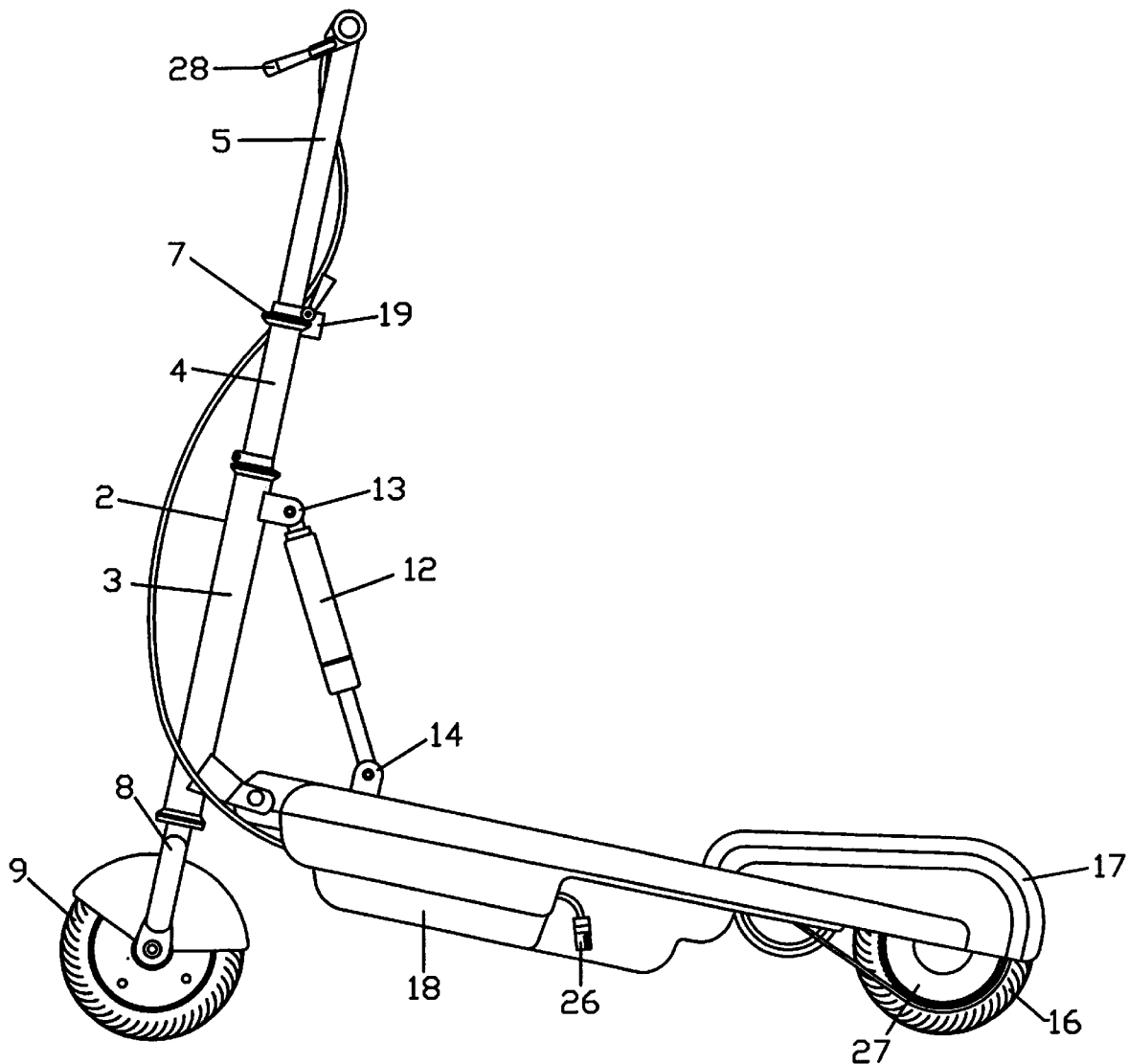
FIG. 1 is a side elevational view showing the portable collapsible scooter in an operating position with the collapsible strut in its extended position.

Referring to FIGS. 1–5, a preferred embodiment of the present invention is illustrated. The portable collapsible scooter includes a steering assembly 2 which contains a head tube 3, a steerer tube 4 journaled within the head tube 3 so as to allow the steerer tube 4 to rotate relative to the head tube 3, a handlebar stem 5 attached to a handlebar 6 with the handlebar stem 5 telescopically attached to the top portion of the steerer tube 4, and a front wheel 9 rotably mounted to a fork member 8, said fork member 8 secured to the bottom portion of the steerer tube 4.

A frame assembly 1, having a front portion and a rear portion, is pivotally secured at the front portion of said frame 1 to the head tube 3 of the steering assembly 2 by means of a pivot tube 15. A rear wheel 16 is rotably mounted to the rear portion of said frame assembly 1. A hydraulic gas spring strut 12 is pivotally secured at one end to the head tube 3, utilizing an upper strut mount 13, and said strut 12 is secured at the other end to the frame assembly 1, utilizing a lower strut mount 14. When the hydraulic gas spring strut 12 is in an extended position, it releasably locks the steering assembly 2 in a generally vertical position for operation by a rider, and when said strut 12 is in a compressed or collapsed position, it releasably locks the steering assembly 2 in a position generally parallel to and adjacent to the frame assembly 1, for storing or transporting the scooter.

In a preferred embodiment the hydraulic gas spring strut 12 is secured in a position relative to the steering assembly 2 and frame assembly 1 so as to provide an over center feature when the strut 12 is being compressed. As the hydraulic gas spring strut 12 is nearing full compression, while the steering assembly 2 is being collapsed, the strut 12 passes through a neutral position and then extends a short distance which acts to releasably lock the steering assembly 2 in a collapsed position. To unlock the steering assembly 2, a rider merely lifts up on the steering assembly 2 with a quick upward motion. The hydraulic gas spring strut 12 also provides a unique feature to the scooter while it is in operation. Under normal operating conditions the strut 12 holds the steering assembly 2 in a fixed upright position; however, the steering assembly 2 may be released and rotated about the pivot tube 15 by pulling the handlebar 6 of the steering assembly 2 towards the rider. This dynamic action provides a stock absorption feature to the scooter which is the result of a slight rotation of the steering assembly 2 about the pivot tube 15 and a resultant upward movement of the front wheel 9.

Although use of the hydraulic gas spring strut 12 in the present invention is the preferred embodiment, other strut mechanisms are part of the present invention. For example, the hydraulic gas spring strut 12 may be replaced with a spring strut which is pivotally secured at one end to the steering assembly 2 and at the other end to the frame assembly 1. Similarly, the hydraulic gas spring strut 12 may be replaced with a rigid strut member which collapses or folds into two or more sections to enable the rigid strut to collapse. Another replacement would include a rigid strut that is pivotally secured at one end to the steering assembly 2 and slidably connected at the other end to the frame assembly 1, or pivotally connected to the frame 1 and slidably connected to the steering assembly 2.

The frame assembly 1 may take several different conventional shapes; however, in a preferred embodiment, the frame assembly 1 is formed by using a tubular member 10 having a curved front section and a pair of opposing leg members. A plurality of elongated cross members 11 are connected to the opposing leg members in order to provide strength and rigidity to the tubular member 10.

In another preferred embodiment the steering assembly 2 contains a compression collar 7 for releasably securing the steerer tube 4 to the handlebar stem 5 in order to permit the handlebar 6 to be raised or lowered.

Figure 2:
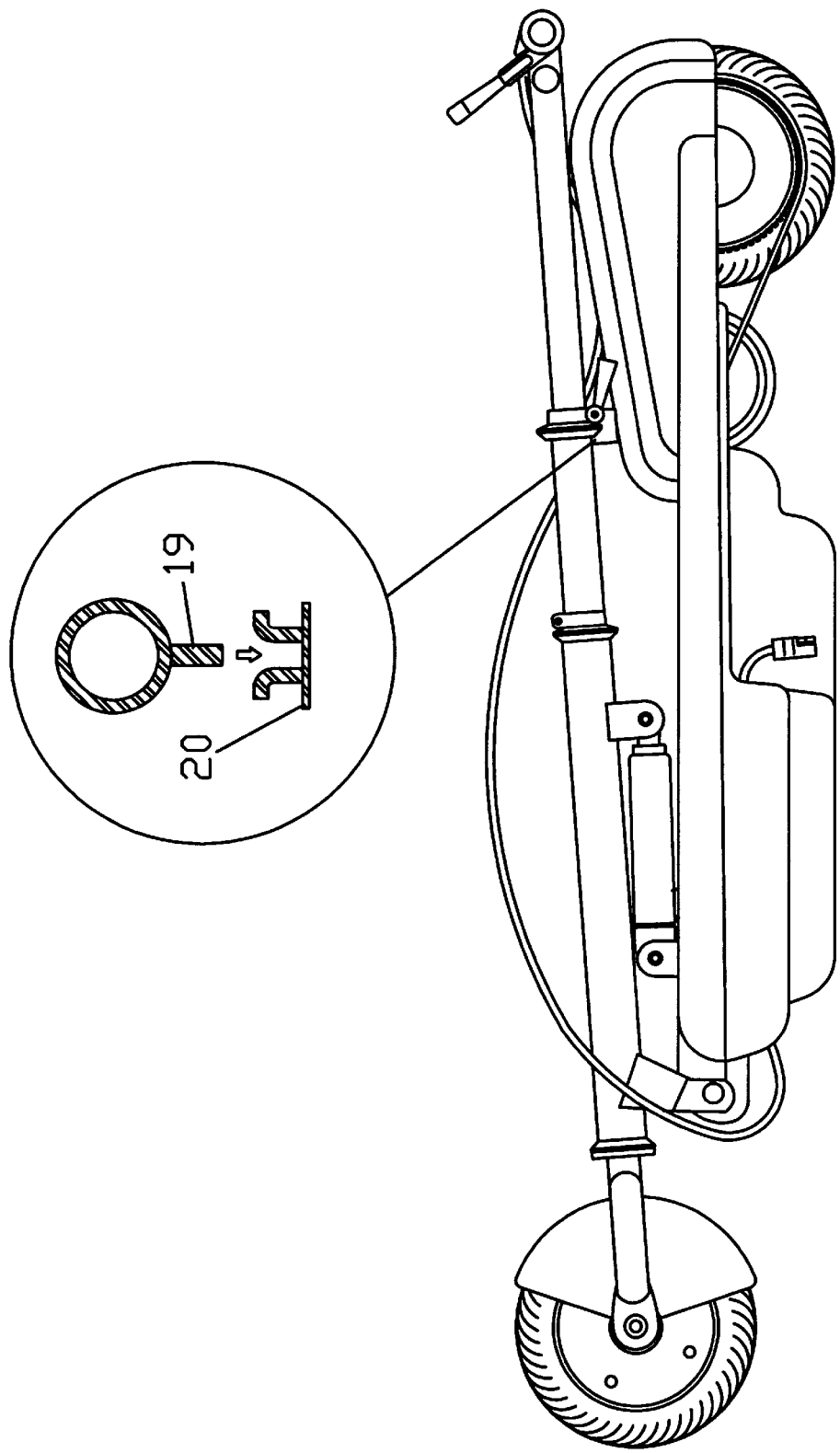
FIG. 2 is a side elevational view showing the scooter of FIG. 1 in a collapsed position with the collapsible strut in its collapsed position.
Figure 3:
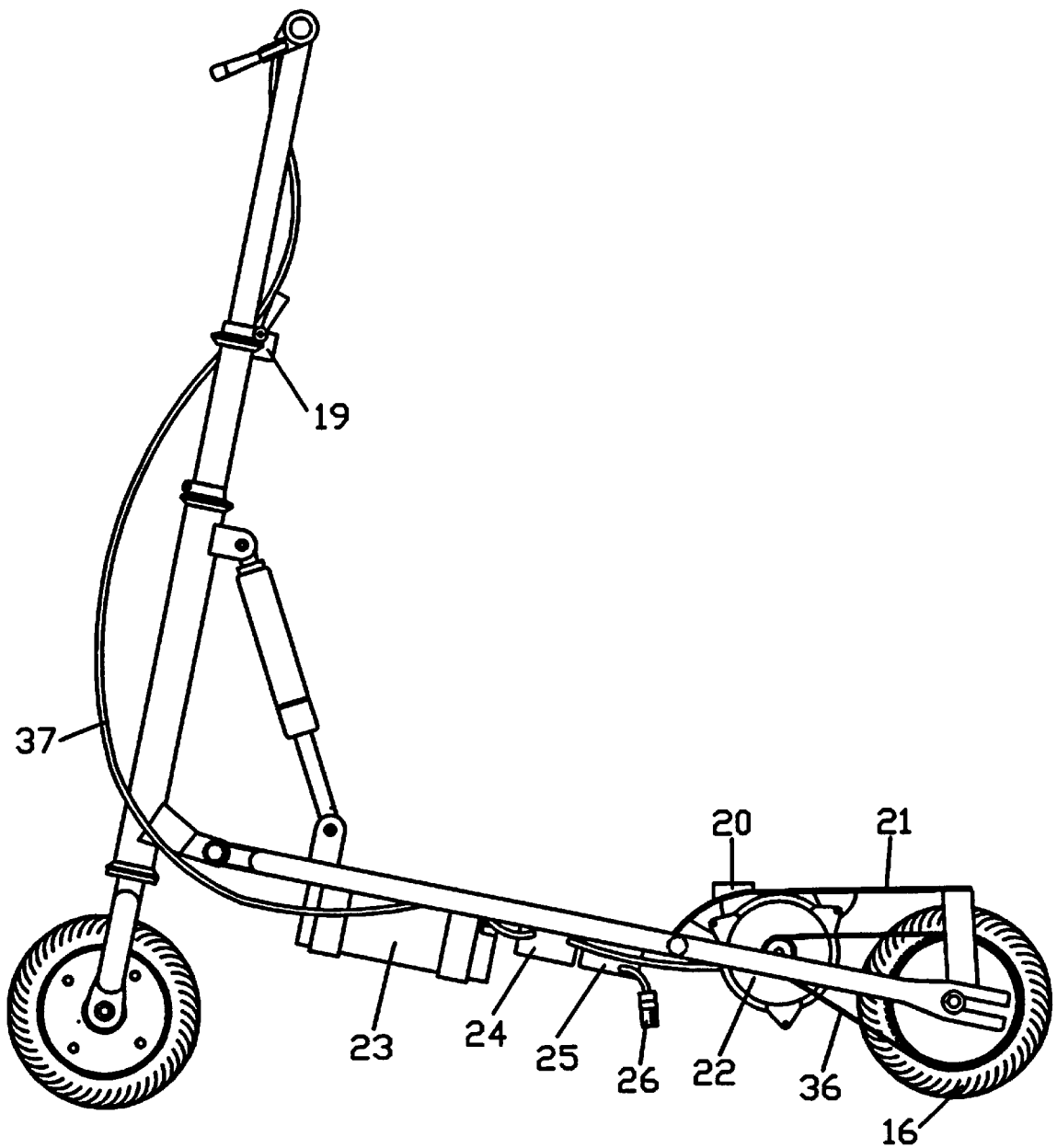
FIG. 3 is a partial side elevational view of FIG. 1 with an upper plastic cover and a lower plastic cover removed in order to show a battery, charger, motor and motor mount, and to more fully show a charging lead, drive belt and rear wheel.

An upper plastic cover 17 and a lower plastic cover 18 are mated together to form a generally hollow platform assembly 34 which encases and is secured in any convention manner to the frame assembly 1. A front upper portion of the upper plastic cover 17 is generally flat and a rear upper portion is slightly raised so as to accommodate a motor mount 21 secured to the frame 1. The generally flat upper portion of the upper plastic cover 17 permits a rider to stand on the platform assembly 34 between the front wheel 9 and rear wheel 16. As shown in the detail of FIG. 2, the frame assembly 1 also includes a steering lock receiver 20 which is secured to the frame 1 and extends upwardly through the upper plastic cover 17 and is designed to mate with a steering lock 19 secured to the steering assembly 2 so that said steering assembly 2 may be releasably locked to the frame assembly 1 when the steering assembly 2 is collapsed into a position generally parallel and adjacent to said frame 1. When the steering assembly 2 is locked into position, the scooter may be carried, using one of two carrying handles 30 defined by holes in the platform assembly 34, located on opposite sides of said platform assembly 34. In this locked position, the scooter may be also pushed or pulled by first lifting up on the handlebar 6, rotating the collapsed scooter upside down, or approximately one hundred and eighty degrees, and then rolling the scooter on the front wheel 9.

Figure 4:
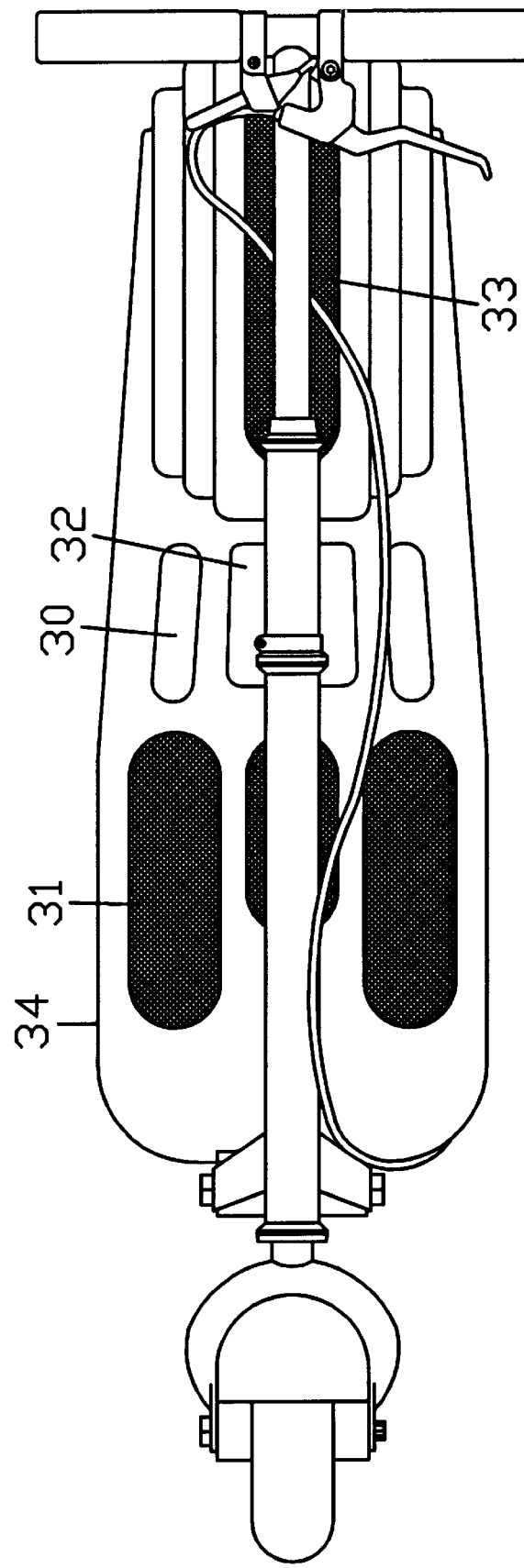
FIG. 4 is a top view of the portable collapsible scooter with the steering assembly in a collapsed position.

FIG. 4 illustrates in additional detail a preferred embodiment of the generally flat upper portion of the upper plastic cover 17 as having a non-skid surface 31 to provide a rider with sufficient traction. The non-skid surface 31 may be composed of any generally known material for such purpose and may be secured to the upper portion of the upper plastic cover 17 by any means generally known in the art. The non-skid surface 31 may also be provided by utilizing any generally known method for incorporating a rough, textured surface to the upper surface of the upper plastic cover 17. The slightly raised rear portion of the upper plastic cover 17 also provides a rear foot hold 33 to enable a rider to place one foot behind the other foot. The upper plastic cover 17 also includes an access door 32 to provide easy access to the inside of the frame assembly 1.

Figure 5:
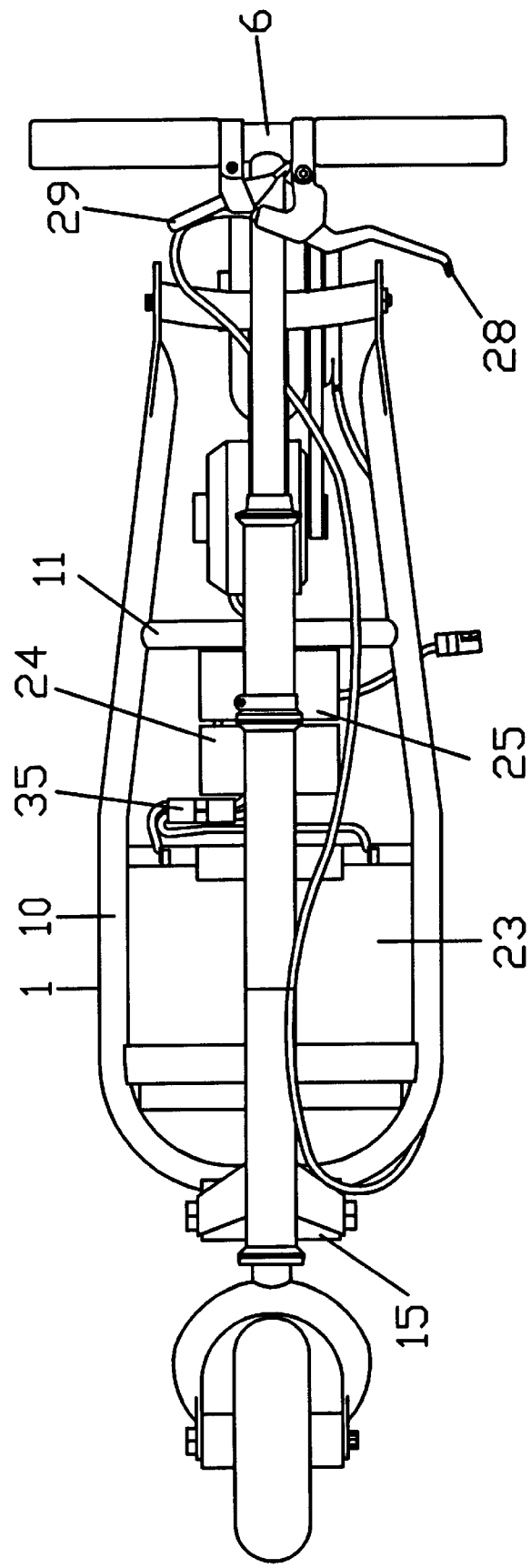
FIG. 5 is a partial top view of the collapsed scooter shown in FIG. 4 with the upper and lower plastic cover removed.

FIG. 5 further illustrates a battery 23, preferably a twelve volt source, releasably attached to the front portion of the frame assembly 1 utilizing a quick release electrical connector 35 to permit the battery 23 to be quickly removed and replaced. An electric motor 22 is mounted to the motor mount 21, said motor mount 21 is secured to the rear portion of the fame assembly 1. The motor 22 is electrically connected to the battery 23 and is driveably connected to the rear wheel 16 by means of a drive belt 36. A charger 25 is secured to the frame assembly 1, adjacent to the battery 23, and is electrically connected to the battery 23. A charging lead 26 is operably connected to the charger 25 in order to provide electrical power to the charger 25 for recharging the battery 23 from an automobile, boat or other similar charging system. While the preferred embodiment discloses the motor 22 operably connected to the rear wheel 16, it is understood that an equivalent design would operably connect the motor to the front wheel 9.

Referring to FIG. 5, the frame assembly 1 is illustrated in its preferred embodiment as comprising a tubular member 10 with a curved front section and a pair of opposing leg members. A plurality of elongated cross-members 11 are connected to the opposing leg members of the frame assembly 1 in order to provide strength and rigidity to said frame assembly 1. A brake assembly 27 is operably connected to the left side of the rear wheel 16 and a brake cable 37 connects the brake assembly 27 to a brake lever 28 attached to the handlebar 6.

Figure 6:
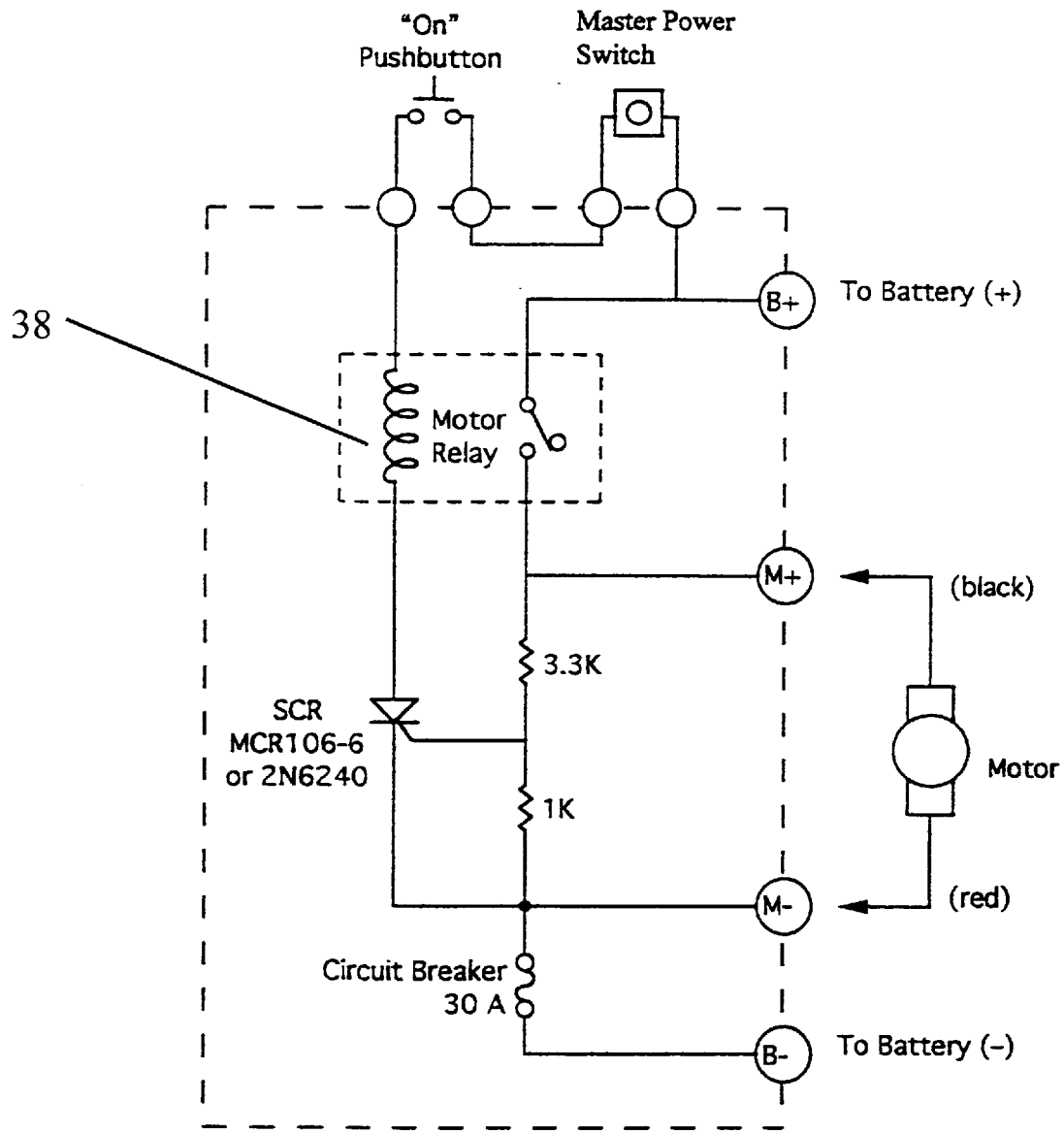
FIG. 6 is a schematic drawing of a controller circuit.

FIG. 5 also illustrates a motor controller 24 secured to the frame assembly 1. The motor controller 24 consists of a circuit, as illustrated schematically on FIG. 6, which controls the operation of the motor 22. The motor controller 24 is designed such that the circuit remains open when the rear wheel 16 is not rotating and remains open until the rear wheel 16 begins rotating and attains a pre-determined rotational rate of approximately one-hundred revolutions per minute. As the rear wheel 16 begins rotating, the motor 22 starts generating some voltage across the motor controller circuit. When the rear wheel 16 reaches the rotational rate of approximately one-hundred revolutions per minute, the resultant increase in voltage causes an inductance, generated by the motor controller circuit, to reach a sufficient level so as to cause a motor controller relay switch 38 to close. A throttle switch 29, having an off and on position for turning the motor off and on, is attached to the handlebar 6 and is electrically connected in series to the circuit of the motor controller 24. Due to the operation of the motor controller relay switch 38, however, the throttle switch 29 cannot operate the electric motor 22 until the rear wheel 16 begins rotating at the predetermined rate and said relay switch 38 closes the motor controller circuit. In a preferred embodiment the throttle switch 29 has a toggle design that permits a rider to easily operate said switch 29 while continuing to hold onto the handlebar 6. In operation the motor controller 24 provides a substantial improvement over previously known scooters because it permits a rider to begin riding the scooter and establish his or her balance before the motor 22 is activated. Once the scooter reaches the predetermined speed, the motor controller circuit closes and electrical power from the battery 23 may be supplied to the motor 22 as soon as the throttle switch is activated by the rider. This mode of operation also provides a smooth transition of power from the manpower supplied by the rider to the electrical power supplied by the motor 22.

In another preferred embodiment, when the portable scooter is in operation with the steering assembly 2 in a generally vertical position, the steering assembly 2 forms a generally symmetrical shape about a generally vertical axis extending from a point where the front wheel 9 contacts the ground to a point where the handlebar stem 5 attaches to the handlebar 6. In addition, sufficient clearance is provided between the fork member 8 and frame assembly 1 so as to permit the steering assembly 2 to be rotated one hundred and eighty degrees about the axis, in either a clockwise or counter-clockwise direction.

Finally, as most readily demonstrated in FIG. 2, the lower plastic cover 18 is designed to provide a generally flat bottom surface. When the scooter is in a collapsed position, the front wheel 9 will have rotated upwardly a sufficient distance so as to permit the collapsed scooter to rest on the flat bottom surface of the lower plastic cover 18 and on the rear wheel 16. As a result, the collapsed scooter may be easily stored in a generally flat, compact, stable and horizontal position.

Although a specific embodiment of an improved portable collapsible scooter has been disclosed in the above description, it will be understood that various modifications and changes within the scope and spirit of the present invention may occur to those skilled in the art. As a result, no limitations should be placed on the invention other than as defined by the scope of the appended claims.

What is claimed is:

1. A portable collapsible scooter comprising:

a frame assembly having a front and a rear portion;

a rear wheel rotatably mounted to the rear portion of the frame assembly;

a steering assembly having a head tube pivotally secured to the front portion of the frame assembly, a steerer tube having a top portion and bottom portion, said steerer tube journaled within the head tube so as to allow the steerer tube to rotate relative to said head tube, a handlebar stem connected to a handlebar, said handlebar stem secured to the top portion of the steerer tube, and a front wheel rotatably mounted to said fork member; and a compressive brace means pivotally secured at one end to the steering assembly and pivotally secured at the other end to the frame assembly, whereby the compressive brace means releasably secures the steering assembly in a generally vertical position for use in the riding the scooter and for allowing the steering assembly to pivotally rotate relative to the frame assembly into a position generally adjacent to the frame assembly for storing or transporting the scooter.

2. The collapsible scooter of claim 1 in which the compressive brace means is a hydraulic gas spring.

3. The collapsible scooter of claim 1 in which the compressive brace means is a spring strut.

4. The portable collapsible scooter of claim 1, 2 or 3 further comprising:

a motor mounted on the rear portion of the frame assembly;

a drive means for driveably connecting said motor to the rear wheel;

a power source secured to the frame assembly for supplying power to the motor;

a throttle switch which is electrically connected to the power source, said throttle switch having an on and off position for turning the motor on and off; and a motor controller means for supplying power to the motor when the throttle switch is in the on position and after the rotating rear wheel causes the motor to generate a sufficient voltage to cause a motor relay switch to close a motor controller circuit thereby activating the motor.

\* \* \* \* \*